United States Patent [19]

Wilcox

[11] 4,387,451

[45] Jun. 7, 1983

[54] LOW FREQUENCY NONRESONANT ACOUSTIC PROJECTOR

[75] Inventor: Howard A. Wilcox, San Diego, Calif.

[73] Assignee: The United States of America as represented by the Secretary of the Navy, Washington, D.C.

[21] Appl. No.: 270,081

[22] Filed: Jun. 3, 1981

[51] Int. Cl.³ .......................................... G10K 10/00
[52] U.S. Cl. ................................... 367/142; 181/142
[58] Field of Search ............... 367/140, 141, 142, 189; 181/139, 142; 116/27, 137 R

[56] References Cited

U.S. PATENT DOCUMENTS

| | | | |
|---|---|---|---|
| 2,432,101 | 12/1947 | Shepherd | 343/11 |
| 2,437,275 | 3/1948 | Skene et al. | 177/351 |
| 2,865,014 | 12/1958 | Malm | 340/3 |
| 3,137,835 | 6/1964 | Bielecki et al. | 367/142 |
| 3,548,642 | 12/1970 | Flaherty et al. | 73/67.5 |
| 3,620,625 | 11/1971 | Johanneshov | 356/1 |
| 3,744,013 | 7/1973 | Lapetina | 340/3 R |
| 3,752,255 | 8/1973 | Hill et al. | 181/0.5 NP |
| 3,886,490 | 5/1975 | Green | 340/5 MP |

OTHER PUBLICATIONS

By William N. Barnard, et al., entitled Heat-Power Engineering, Third Edition of second part of Hirshfeld and Barnard's Elements of Heat-Power Engineering, 1935, pp. 244-247 (enclosed).

Primary Examiner—Richard A. Farley
Attorney, Agent, or Firm—Robert F. Beers; Ervin F. Johnston

[57] ABSTRACT

A nonresonant acoustic projector especially suited to the creation of low frequency (0–100 Hz, approximately) acoustic signals is provided, this projector including a housing and a rocker arm which is mounted within the housing on a pivotal transverse axis fixed with respect to the housing. At least one piston is sealably mounted in a wall of the housing so that one face of the piston is directed exteriorally and the other face of the piston is directed interiorally with respect to the housing. The inner piston face is connected to a piston push rod which extends perpendicularly to the piston face into the housing, the inner end of this piston push rod being pivotally connected to the rocker arm at a point offset from the rocker arm pivotal axis. A power drive device is connected to the rocker arm at a second offset location for the purpose of rocking the rocker arm in an oscillatory manner about its pivotal axis, wherefore the attached piston push rod forces the piston into reciprocatory movement directed along the axis of the piston push rod. Various power drive devices are described hereinbelow which result in many desirable embodiments of the invention.

13 Claims, 17 Drawing Figures

FIG. 15

LOW FREQUENCY NONRESONANT ACOUSTIC PROJECTOR

STATEMENT OF GOVERNMENT INTEREST

The invention described herein may be manufactured and used by or for the Government of the United States of America governmental purposes without the payment of any royalties thereon or therefor.

BACKGROUND OF THE INVENTION

The U.S. Navy utilizes underwater acoustic projectors for many purposes, such as for testing and calibrating surveillance equipment and other types of sound receiving equipment aboard surface ships or submarines. Prior acoustic projectors of the low frequency type have been relatively bulky and expensive, and since they have generally been of the mechanically resonant type they have not been capable of producing amplitude modulation and frequency modulation of their output signals at varying depths without having changes in any one of these variables being coupled to and hence producing resultant changes in one or more of the other variables. Prior art acoustic projectors of the low frequency type also have generally used various sorts of intricate drive mechanisms which rendered the projector expensive to manufacture, bulky, and inefficient.

SUMMARY OF THE INVENTION

The present invention provides an acoustic projector which is much simpler to construct and operate, and which has significantly increased versatility, as compared to prior art projectors for low frequencies. This has been accomplished by providing a rocker arm which is mounted within a housing on a fixed pivotal axis and which extends laterally therfrom. At least one piston is sealably mounted in a wall of the housing so that one face of the piston is directed exteriorally and the other face of the piston is directed interiorally with respect to the housing. The piston is fitted with a push rod which extends into the housing and which is pivotally connected to the rocker arm laterally from the rocker arm pivotal axis. A power drive device is connected to the rocker arm at a lateral drive location for oscillating the rocker arm about its pivotal axis so that the piston will respond with reciprocatory movement. The rocker arm oscillation means may include a power driven rotor, various levers, and a positioning device for one of the levers. With this arrangement the signal output of the projector can be easily controlled in amplitude and/or frequency. In another embodiment of the invention the rocker arm oscillation means is modified to enable instantaneous switching of the projector between on and off conditions. In a further embodiment of the invention the rocker arm oscillation means is modified so that the projector can be instantaneously switched between on and off conditions and also can be changed from fundamental to second harmonic frequency signals and back again. In still another embodiment of the invention the rocker arm oscillation means is modified to obtain instantaneous reversal of the phase of the output signal. And in a still further embodiment of the invention the rocker arm oscillation means is modified to force the projector to emit two or more anharmonically related frequencies simultaneously, these various frequencies being amplitude moduable together and frequency modulable separately.

STATEMENT OF THE OBJECTS OF THE INVENTION

An object of the present invention is to provide an underwater acoustic projector which is easier and less costly to manufacture and has improved performance.

Another object of the invention is to provide an underwater acoustic projector which can be amplitude modulated and/or frequency modulated at various depths without a change in any one of these variables being coupled to and so producing a resultant change in any of the other variables.

Still another object is to obtain the advantages of the foregoing objects while also obtaining instantaneous switchability between on and off signal projection.

Yet another object is to provide an acoustic projector having all of the advantages described hereinabove plus the capability of instantaneous switchability between fundamental and second harmonic signal projections.

A further object of the present invention is to obtain instantaneous reversability of the phase of the output signal.

Still a further object is to provide an acoustic projector which is capable of emitting two or more anharmonically related frequencies simultaneously, these various frequencies being amplitude modulable together and frequency modulable separately.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
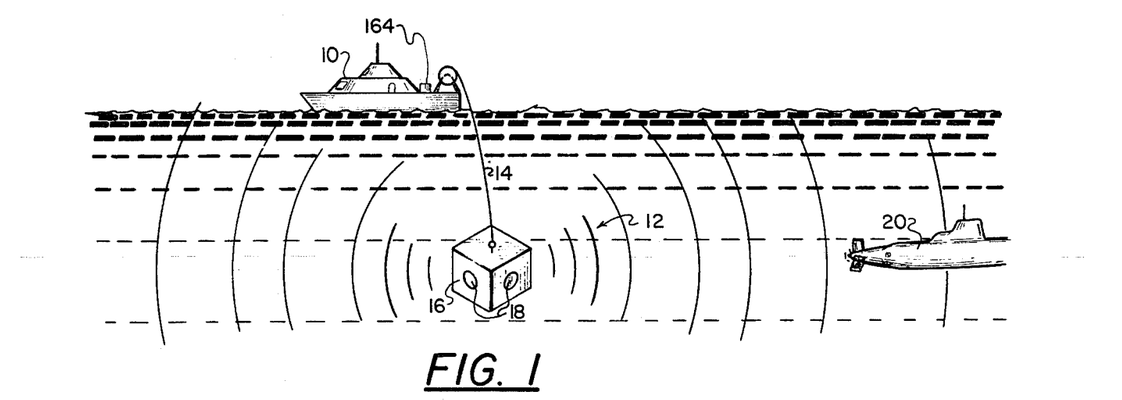
FIG. 1 illustrates a surface ship supporting or towing the submerged acoustic projector while a nearby submarine receives and utilizes the signals put out by the projector.

Referring now to the drawings wherein like reference numerals designate like or similar parts throughout the several views, there is illustrated in FIG. 1 a surface ship 10 towing a nonresonant acoustic projector 12 at a submerged depth by a two cable 14. The acoustic projector 12 includes a housing 16 in which there are one or more pistons 18 for projecting acoustic signals in the water. These signals may be received by a submarine 20 for such purposes as test and calibration of the submarine's acoustic receivers. Also, as will be explained hereinbelow, various embodiments of the invention can be utilized for acoustic communications to submarines on a coded or uncoded basis.

Figure 2:
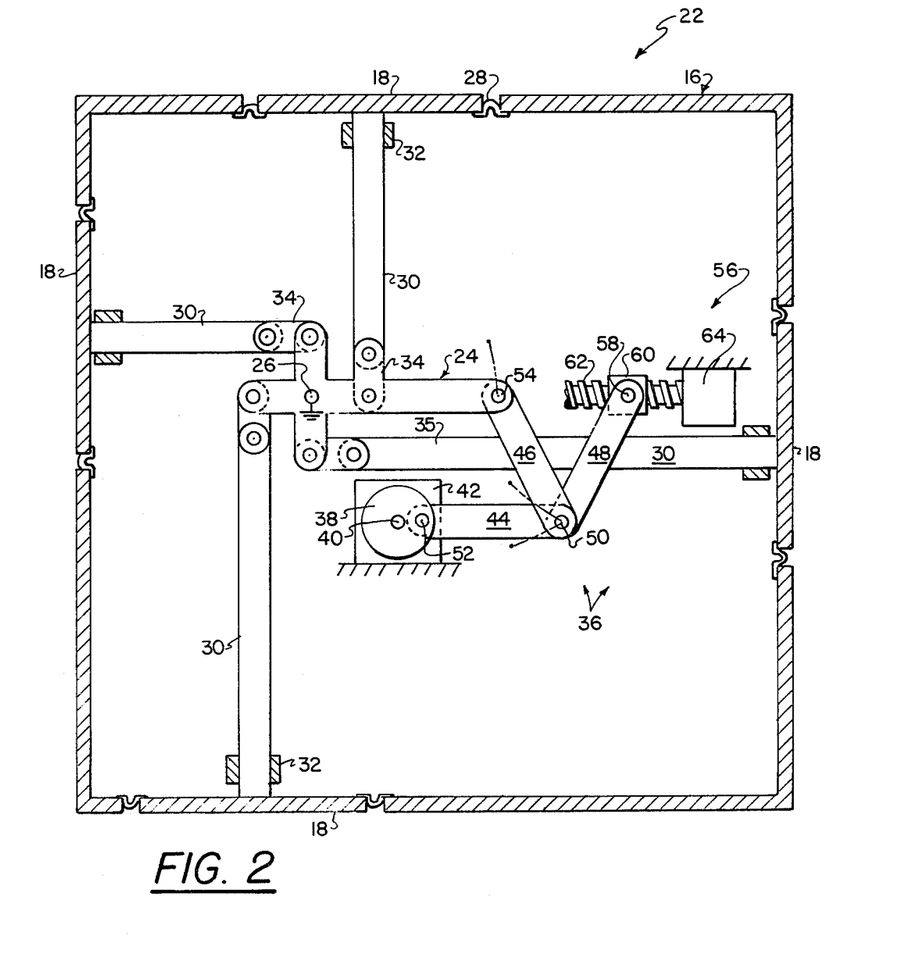
FIG. 2 is a schematic plan view of one embodiment of the acoustic projector.

In FIG. 2 there is illustrated an embodiment 22 of the nonresonant acoustic projector which is capable of amplitude modulation and/or frequency modulation of the output signal waves at varying depths without a change in any one of these variables being coupled to and so producing a resultant change in any of the other variables.

As shown in FIG. 1 the housing 16 may be generally box shaped with the pistons 18 being located in four of the sides of the box. The top of the box is cut away in FIG. 2 so as to show the various components of the acoustic projector. The embodiment 22 of the acoustic projector includes a rocker arm means 24 which is mounted within the housing 16 on a pivotal axis 26 which is fixed with respect to the housing. The rocker arm extends laterally within the housing from the pivotal axis. Piston means, which include one or more of the pistons 18, are sealably mounted in a respective wall of the housing 16 so that one face of the piston is directed exteriorally into the water environment and the other face of the piston is directed interiorally with respect to the housing. Each piston 18 may be sealed to the wall of the housing 16 by, for example, a rolling seal 28. One end of a piston push rod 30 may be connected to the inner face of a respective piston 18, and the other end of the piston push rod may be pivotally connected to the rocker arm 24 at a position which is located laterally from the rocker arm pivotal axis 26. Linear bearings 32, which are fixed to the housing, may provide longitudinal guidance for the piston rods 30, and pivotal links 34 may be provided in the piston rods to assist in accommodating the arcuate movement of the rocker arm 24 at the connecting points to the piston rods.

The rocker arm means 24, which may be in the shape of a cross, for example, for operating two pairs of pistons, has an extended arm 35 to the right in FIG. 2 to which there is pivotally connected means 36 for rocking the rocker arm 24 in an oscillatory manner about its pivotal axis 26 so that the pistons 18 will be forced into reciprocatory movement. The rocker arm oscillating means 36 of the FIG. 2 embodiment includes a rotor 38 which is rotatably mounted within the housing on a fixed axis 40 which is parallel to the rocker arm pivotal axis 26, the rotor 38 extending laterally within the the housing with respect to the axis 40. A motor 42, which is fixed to the housing 16, may be utilized for driving the rotor 38, and a flywheel (not shown) may be mounted on the motor drive shaft for smoothing out rotor speed fluctuations which might otherwise occur during each rotor turning cycle. The rocker arm oscillation means 36 may further include a first, second, and third levers 44, 46, and 48, respectively which are mutually pivoted at a point 50. The first lever 44 is eccentrically pivotally connected at a second point 52 to the rotor 38, the second lever 46 is pivotally connected at a second point 54 to the extended arm 24, anbd the third lever 48 is pivotally connected at a second point 58 to the lever adjusting means 56. The lever adjusting means 56 may include a worm gear 60 which is pivotally connected at the point 58 to the lever 48, a worm 62 which engages the worm gear 60, and a fixed reversible motor 64 for rotating the worm 62 and adjusting the connecting point 58 of the worm gear 60 and the third lever 48 laterally within the housing.

In the FIG. 2 embodiment the motor 42 for the rotor 38 may be operated at varying speeds to frequency modulate the oscillatory motions of pistons 18. Further, the lever adjusting means 56 may be operated to vary the position of the third lever 48 which will result in amplitude modulation of the oscillatory motions of the pistons 18. The second and third levers 46 and 48 of the FIG. 2 embodiment are of the same length, a fact which forces the pistons to oscillate with zero amplitude when the point 58 is brought into axial coincidence with point 54 by the lever adjusting means 56. When these two points, 54 and 58, are gradually separated from axial coincidence, the amplitude of motion of the pistons 18 will gradually increase. It should be noted that there are no cams or other intricate mechanisms required for the operation of the acoustic projector, and that simple lever action around fixed or slowly moving axes is involved in the operation. Further, any integer number of pistons from one to twelve or more may be utilized by such simple expedients as ganging several rocker arm and piston assemblies on the same shaft 26, and the housing 16 can be of any desired shape.

Figure 3:
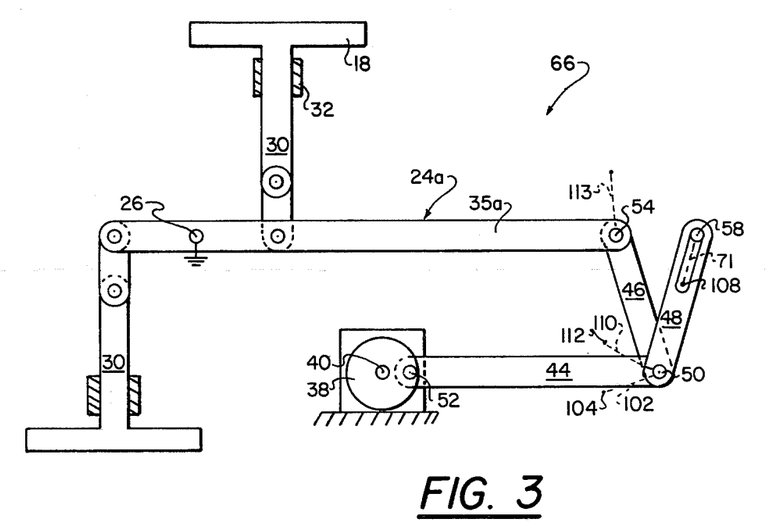
FIGS. 3 and 4 are schematic plan illustrations of a modification of the FIG. 2 embodiment, which modification results in instantaneous switchability of the projector between on and off signal projection conditions, with certain components in FIG. 4 omitted from FIG. 3 for description purposes.
Figure 4:
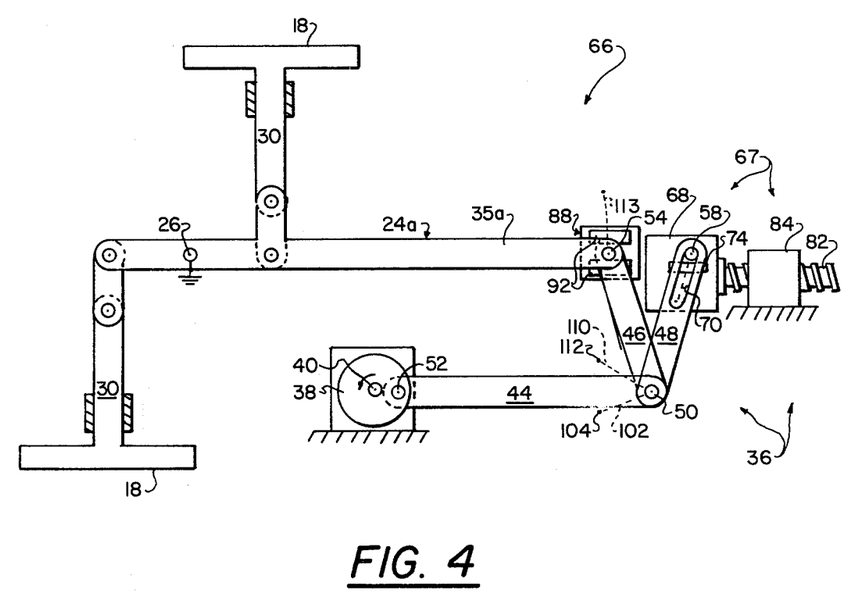

FIGS. 3 and 4 illustrate another embodiment 66 of the present invention. As illustrated in FIG. 4 certain components are added to the rocker arm oscillating means 36 for the purpose of obtaining instant switchability between on and off conditions of the acoustic projector. FIG. 3 illustrates the embodiment 66 with these components removed for description of the movements of the various levers. The embodiment 66 of the invention can be considered as a modification to the previously described embodiment 22 illustrated in FIG. 2. Throughout this description each end portion of each lever arm can be considered to have an associated bearing or journal, the axis of each bearing or journal being illustrated as a point in the drawings. For simplification purposes the reference numerals to the points will be used to denote the journals throughout the specification. The lever arms 46 and 48 for the embodiment 66 may be of the same length, as described hereinabove for the embodiment 22.

Figure 9:
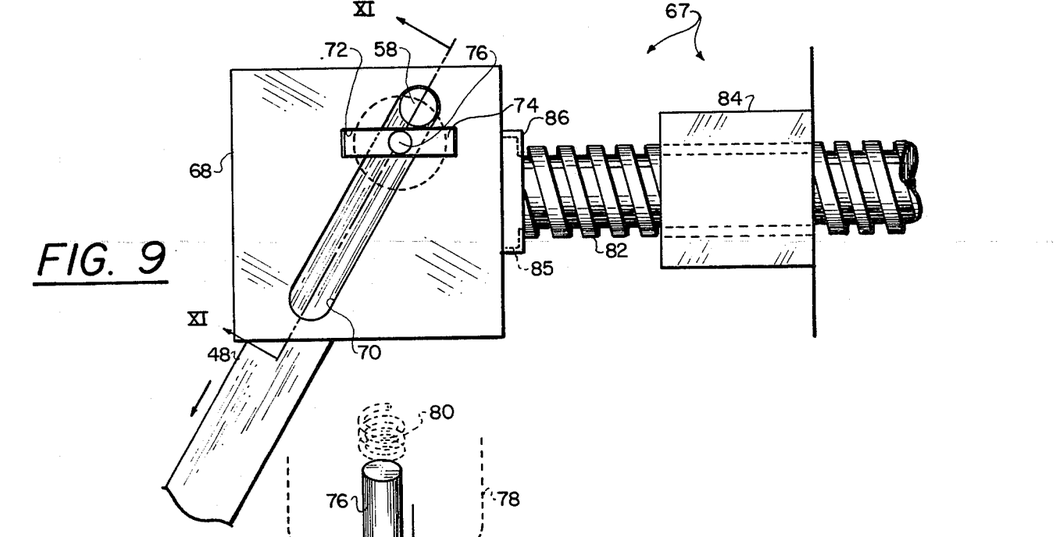
FIG. 9 is a schematic plan view of a lever adjusting and clamping device utilized in the FIG. 4 embodiment.
Figures 10, 11:
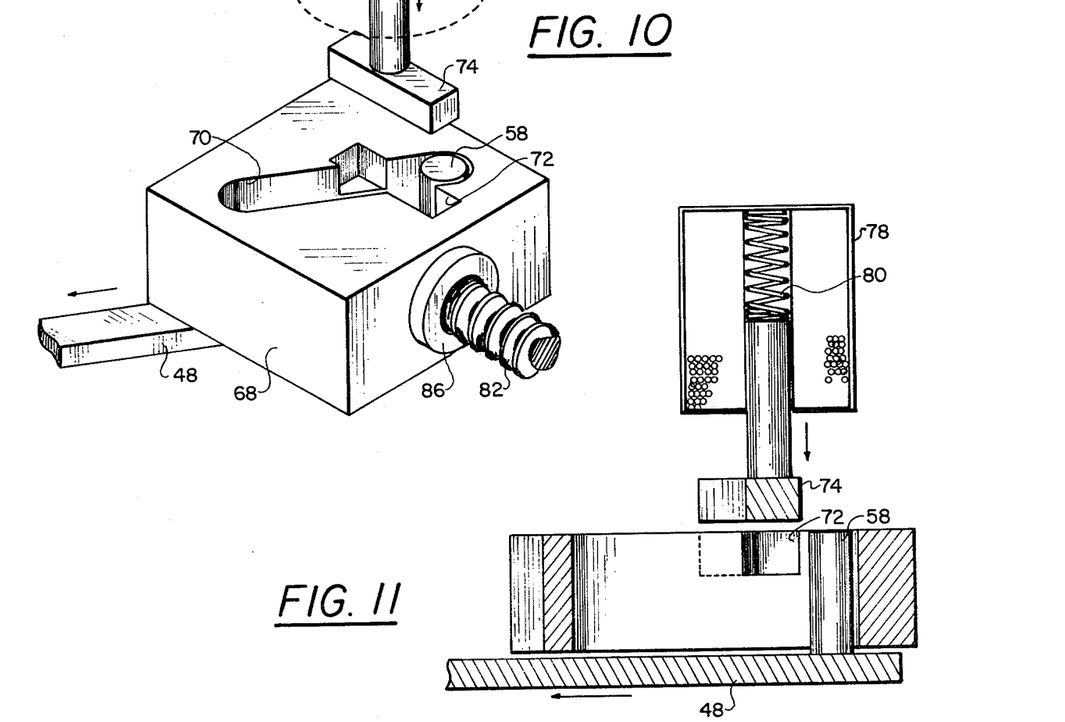
FIG. 10 is an isometric view of the lever adjusting and clamping device of FIG. 9 in an unclamped position.
FIG. 11 is a view taken along plane XI—XI of FIG. 9.
Figure 12:
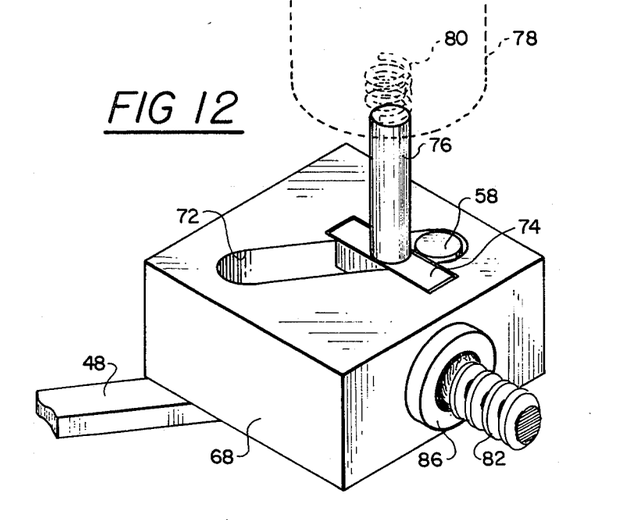
FIG. 12 is an isometric view of the lever adjusting and clamping device of FIG. 9 in a clamped position.

As illustrated in FIG. 4, means 67, which may include a block 68 with a slot 70, may be utilized for guiding the second point or journal 58 of the third lever 48 along a lateral path 71 of predetermined length (see FIG. 3). In actuality the slot 70 and the resultant path 71 may be straight or arcuate in any direction except perpendicular to the longitudinal axis of the third lever 48 in any of the third lever positions. Additional details of the components operating with the lever arm 48 are illustrated in FIGS. 9 through 12. As illustrated in FIGS. 9 through 12 as well as FIG. 4, the block 68 has a recess 72 which is transverse to the slot 70. The recess 72 is capable of receiving a detent 74 which is mounted to a plunger 76 of a solenoid 78. The solenoid 78, which is fixedly mounted to the housing, has an internal spring 80 which pushes the detent 74 into the recess 72 unless the solenoid 78 is energized. If the solenoid is energized it acts to withdraw the detent 74 from the recess 72 despite the push of the spring 80. As illustrated in FIG. 10, when the detent 74 is withdrawn from the recess 72 the axle 58 of the lever arm 48 is able to travel back and forth along the slot 70. However, when the detent is pushed into the recess 72, as illustrated in FIG. 12, the axis 58 is locked or clamped into a position at one end of the path 71, as illustrated in FIG. 4. Further, the block 68 is designed to be moved by the action of motor 84 and worm 82 in such a way as to align the axle 58 of lever arm 48 with the axle 54 of the lever arm 46, or to any position therebetween as illustrated in FIG. 4. This is accomplished by the worm 82 and the fixed reversible motor 84 wherein one end of the worm 82 is either driven into or through the motor case 84 as shown in FIG. 9. The other end of the worm 82 may be provided with a flange 85 which is rotatably housed within a hollow boss 86 fixed on the block 68 so that the worm can freewheel therein.

Figure 14:
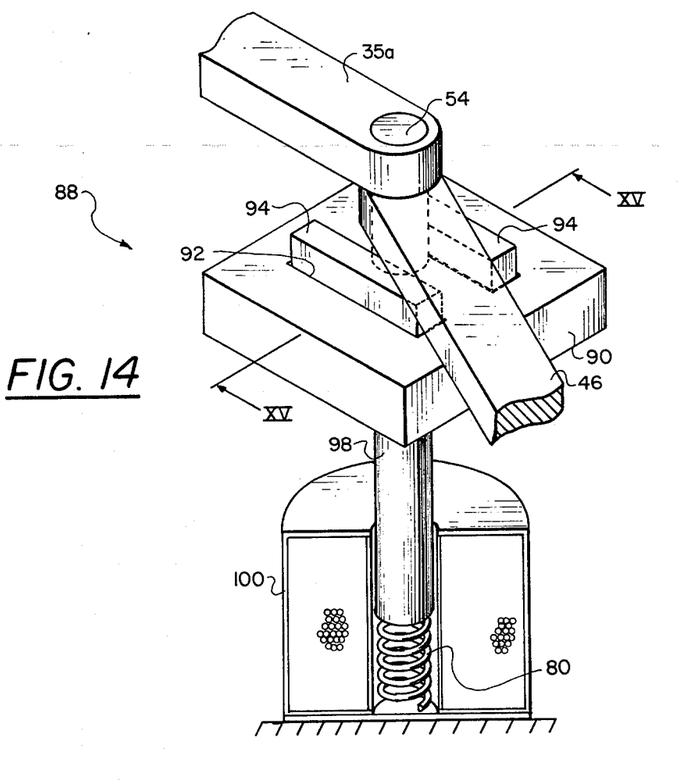
FIG. 14 is an isometric view of the lever clamping device of FIG. 13 in a clamped position with portions cut away to illustrate various details.
Figure 15:
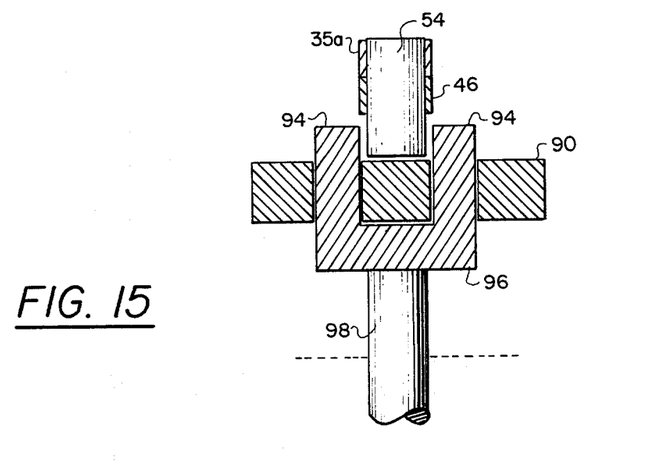
FIG. 15 is a cross-sectional view taken along plane XV—XV of FIG. 14.

As illustrated in FIG. 4, means 88 may be used for selectively clamping the axle 54 of levers 46 and rocker arm 35a in the position shown in FIG. 4. The clamping means 88, which is illustrated in more detail in FIGS. 13, 14, and 15, includes a block 90 which is affixed to the housing in juxtaposition to the end of the axle 54. The block 90 has a pair of spaced apart slots 92 which receive the legs 94 of a U-shaped detent member 96. The U-shaped detent member 96 is mounted to the plunger 98 of a solenoid 100 and spring 80 assembly which operates in the same manner as the solenoid 78 described hereinabove. When the solenoid 100 is deactivated the spring 80 therein pushes on the shaft 98 so that the legs 94 protrude through the recesses 92 in the block 90 to capture the axle 54 and prevent its movement. When the solenoid is activated the members 94 are withdrawn from the recesses 92 despite the push of the spring 80 so as to free the axle for movement as desired.

As stated hereinabove the modification of the embodiment 22 in FIG. 2 by the teachings illustrated in FIGS. 3 and 4 will result in a projector whose piston motions can be instantaneously switched between on and off conditions, namely between a condition of full piston oscillation at any desired amplitude and a condition of piston oscillation at zero amplitude (no oscillation). In FIG. 3 the components of FIG. 4 associated with the levers 46 and 48 have been removed so as to better describe the movements of the journals of the levers when the components are selectively operated. With the components illustrated in FIG. 4 the embodiment 66 can be readily switched in a manner which imposes essentially no impulsive loads on any of the projector elements shown in FIG. 3 provided that the switching occurs only and essentially instantaneously when the pistons have reached their turning points, namely, when they are momentarily at zero velocity. Note that the turning point condition occurs twice per cycle, namely when the center of axle 52 is located as shown in FIG. 3 and again when the center of the axle 52 is located 180° from the FIG. 3 location due to a rotation of rotor 38 through 180°.

Referring still to FIGS. 3 and 4, when the axle 54 is clamped by the clamping means 88, the center of the axle 50 is forced to follow the arcuate line of action 102 between the turning points 104 and 50 as the rotor 38 turns about its fixed axle 40, the arc 102 being centered about the point 54. With the axle 54 fixed by the clamp 88, the rocker arm 24a remains stationary and does not oscillate about the axle 26. Accordingly, the piston push rods 30 do not move and so the pistons 18 remain quiescent with a zero amplitude of oscillation. While the center of the axle 50 is moving along the arc 102, the axle 58 is constrained by the track means 68 so that its center moves along the line of action 71 between the turning point 58 (when the center of the axle 50 is located as shown in FIG. 3) and the turning point 108 (when the center of the axle 50 is located at 104). At a moment when the center of the axle 50 and the center of the axle 58 are located in the positions shown in FIGS. 3 and 4, the clamp means 74 can be quickly energized to clamp axle 58 at the same instant that 88 on the axle 54 is quickly released. As the rotor 38 continues to turn the center of the axle 50 is then constrained to follow the new arcuate line of action 110 centered about the clamped point 58. As the axle 50 oscillates along arc 110 between the turning points 112 and 50, the center of the axle 54 will be constrained to oscillate along the arcuate line of action 113 which is centered about the point 26. During this action the rocker arm 24a oscillates about the point 26 and the piston push rods 30 drive their respective pistons in the desired oscillating manner.

It is important to note that the sudden switching change which occurs from a condition wherein the axle 54 is clamped at the FIG. 4 location to one wherein the axle 58 is alternately clamped at the FIG. 4 location does not impose any significant impulsive loads on any of the elements of the projector shown in FIG. 3 because all of the linkages and pistons are then at their zero velocity points. When it is desired to switch the projector back to a condition wherein the pistons are not oscillating, this can be accomplished without imposing any impulsive loads on any of the elements of the projector shown in FIG. 3. This is accomplished by clamping the axle 54 at its FIG. 4 location while simultaneously releasing the clamp on the axle 58 whenever the center of the axle 50 reaches the location shown in FIG. 4.

If it is desired to operate the pistons at a reduced amplitude of oscillation the guide means 67 together with its guiding slot and clamping means 74 are moved by the motor 84 along a line from the FIG. 4 location towards the point 54 as taught hereinbefore. If the axle 58 is made coincident with the axle 54 the amplitude of oscillation of the axle 54 vanishes altogether, which means that the amplitudes of the pistons go to zero, as taught hereinbefore.

Figure 5:
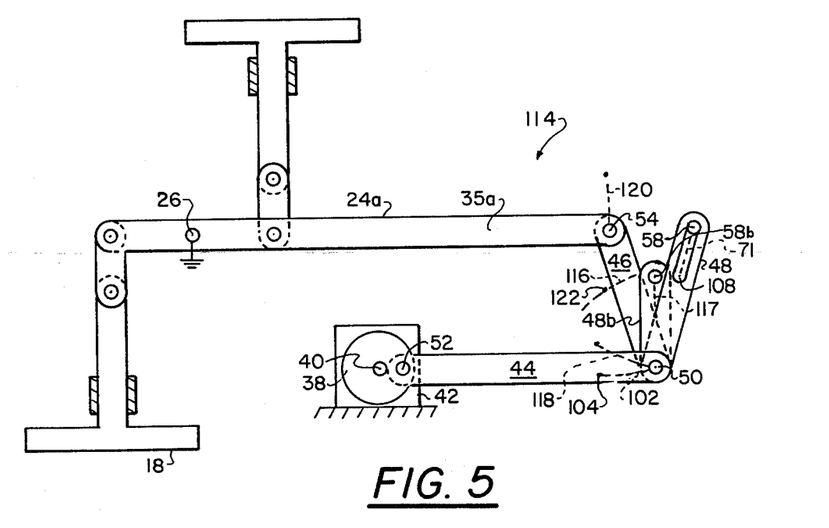
FIGS. 5 and 6 are schematic plan view illustrations of a modification of the FIG. 2 embodiment, which modification results in instantaneous switchability between on and off conditions and between fundamental and second harmonic signal projections. Certain components in FIG. 6 are omitted from FIG. 5 for description purposes.
Figure 6:
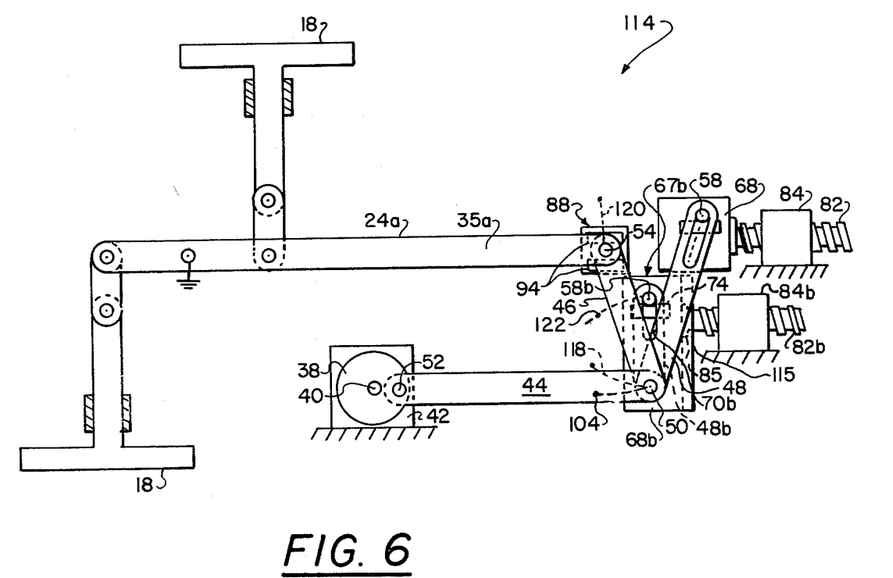

FIGS. 5 and 6 illustrate another modification 114 of the embodiment 22 in FIG. 2. In the modification 114, the levers 46 and 48 are the same length, as illustrated in FIG. 5. In FIG. 6, however, the lever 48 has been lengthened for the purpose of clearly illustrating the components. In actual practice the lever 48 in FIG. 6 is the same length as lever 46. The embodiment in FIGS. 5 and 6 is the same as that illustrated in FIGS. 3 and 4 except that a lever 48b is provided which is significantly shorter than the length of the levers 46 or 48 (such as one half the length thereof); the left end of the worm 82b is not attached to any particular point on the block 68b but instead is slidably attached by a worm flange 85 which is slidably mounted in a track 115 on the right side of the block 68b, and the guide means 67b for the lever 48b is arranged to move the center of the axle 58b along the arcuate line 116 which is centered about the point 50. The latter may be accomplished by pivoting the block 68b of the guide means 67b about a point fixed with respect to the housing at a location coincident with point 50 as seen in FIG. 6. When only the axle 54 is clamped with its center at the FIG. 6 location, the center of the axle 50 will move along the line of action 102 and the center of the axle 58b will move along a line of action 117. However, if only the axle 58b is clamped with its center at the FIG. 6 location, then the axle 50 is forced to move along the arcuate line of action 118 which has its center at the point 58b, and the axle 54 is then forced to move along the arcuate line of action 120.

The FIGS. 5 and 6 arrangement does not produce a pure sinusoidal motion of the pistons, but instead the piston motion can be analyzed into a fundamental component at the turning frequency of rotor 38 plus second, third, and higher harmonics of the motion at twice, three times and higher integer multiples of the rotor turning frequency. If at the moment shown in FIG. 6 the axle 54 is quickly unclamped while the axle 58b is quickly clamped, the pistons will begin to oscillate at an amplitude appropriate to the location of axle 58b as hereinbefore taught. If now the motor 84b is used to move the center of the axle 58b away from the FIG. 5 position along the line 116, it can readily be seen and shown that the amplitudes of the fundamental and of all odd numbered harmonic components of the piston motion will fall faster than the amplitudes of the second and all even numbered components of that motion. Further, when the center of the axle 58b reaches the point 122 which is geometrically defined as the point on arc 116 which is equidistant from the turning points 50 and 104 in FIG. 5, the fundamental and all odd harmonics of the piston motion essentially vanish and only the second and even numbered harmonic components of the motion remain. Consequently, the system is capable of varying the harmonic content of the piston motion in desirable ways in that it can be used to suppress the fundamental and all odd numbered harmonics of the motion while continuing to put out very sizeable amounts of the second and all higher even numbered harmonics of the motion.

Referring again to FIGS. 5 and 6, if axle 54 is clamped at the position shown, the pistons will oscillate with zero amplitude; if only axle 58 of lever 48 is clamped at the position shown, the pistons will put out a signal composed mainly of the fundamental motor turning frequency as hereinbefore taught; but if instead only the axle 58b of lever 48b is clamped at position 122, the pistons will put out a signal composed mainly of the second harmonic of the motor turning frequency. Therefore, as stated hereinbefore, the system can be used to switch between any two of these three modes of motion whenever the center of the axle 50 is at its turning point, as illustrated in FIG. 5.

Figure 7:
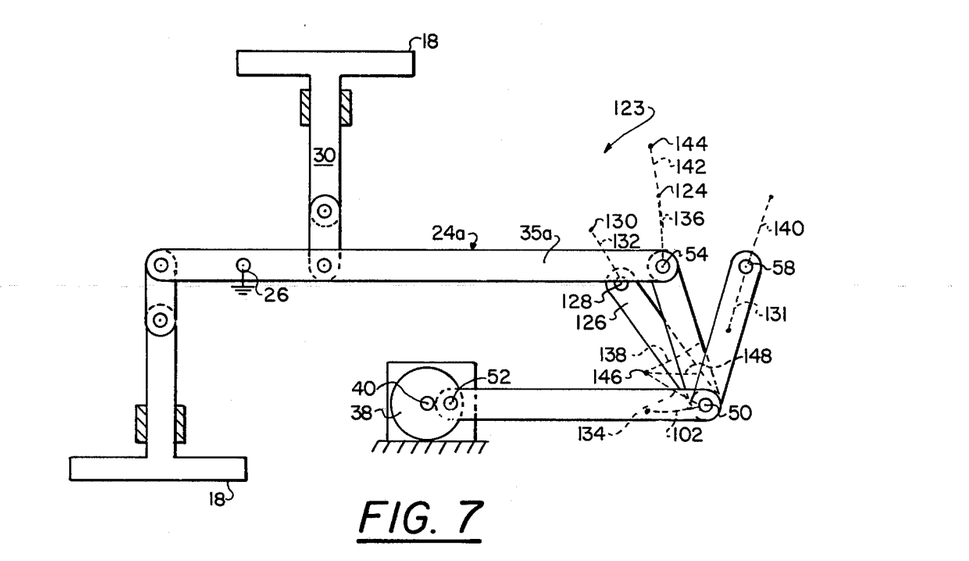
FIGS. 7 and 8 are schematic plan illustrations of a modification of the FIG. 2 embodiment, which modification results in instantaneous switchability between on and off conditions as well as instantaneous phase reversal of the output signal wave. Certain components in FIG. 8 are omitted from FIG. 7 for description purposes.
Figure 8:
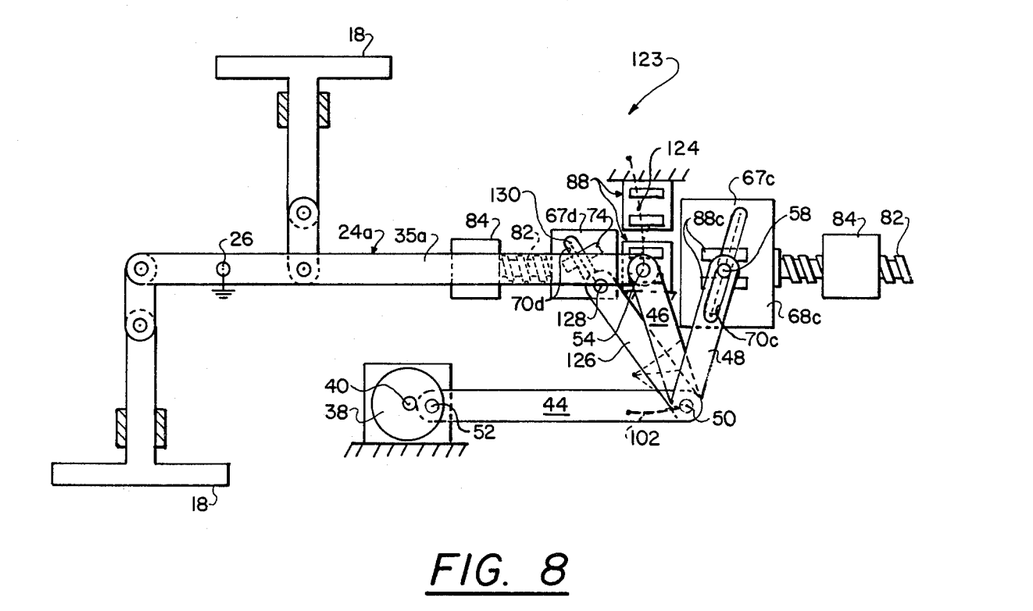

Another modification 123 of the embodiment 22 of FIG. 2 is illustrated in FIGS. 7 and 8. The embodiment in FIGS. 7 and 8 is identical to the embodiment in FIGS. 3 and 4 except that the slot 70c is lengthened, the guide means 67c includes a clamp means 88c, a clamp 88 is introduced at the point 124, the lever arm 126 is introduced along with a guide means 67d for the axle 128, and a clamp 74 is provided at the point 130. With this arrangement the axle 54 can be clamped with its center at the FIG. 8 location, so that the center of the axle 50 will be forced to move along the line 102, the center of the axle 58 will move along a line 131, and the center of the axle 128 will move along the line of action 132 where the line of action 132 is determined by the guiding slot 70d, as illustrated in FIG. 8. If the axle 58 is quickly clamped at the moment when its center is at the FIG. 8 location while the axle 54 is simultaneously quickly unclamped, the center of the axle 50 will be forced to move along the line 134, the center of the axle 54 will be forced to move along the arc 136 between the two turning points 54 and 124, and the center of the axle 128 will be forced to move along the line 132 between the two turning points 128 and 130. Next, if the axle 128 is quickly clamped at the moment when its center is at the point 130, and the axle 58 is simultaneously quickly unclamped, the center of the axle 50 will be forced to move along the arcuate line of action 138 which is centered about the point 130, the center of the axle 58 will be forced to move along the line 140 (as determined by the guiding slot 70c), and the center of the axle 54 will be forced to move along the arcuate line of action 142 between the two turning points 124 and 144, where the center of the arc 142 is the point 26. The desired result of the switching operation when the axle 50 has its center at the point 146 is that the piston velocity oscillation be shifted 180° in phase, again without producing any significant impulsive loads on any of the elements of the projector shown in FIG. 7. The last described switching operation can be reversed whenever the center of the axle 50 is at the turning point 146.

Again in reference to the FIGS. 7 and 8, when the axle 54 has been clamped with its center at the FIG. 7 location, and if the axle 54 is quickly released while the axle 58 is quickly clamped at the moment when the center of the axle 50 is at the FIG. 8 location, the center of the axle 50 will be forced to move along the line 134 to the turning point 146. If at a later time the axle 58 is quickly released and the axle 54 is clamped when 54 is at the point 124 and the center of axle 50 is at the point 146, the subsequent motion of the center of the axle 50 will be along the arcuate line of action 148 which is centered about the point 124 and the center of the axle 58 will be forced to move along the line 140. The effect of these successive switching operations will be readily seen to cause the pistons to engage in an odd number of half oscillations. This result may be especially desirable when the odd number of half oscillations is chosen to be the number one. It is obvious from FIGS. 7 and 8 that by moving the guide means carrying the axles 58 and 128 so as to bring these axles nearer to the axle 54, the amplitudes of the above described motions can be reduced to any desired degree, or even to zero if desired.

Figures 13, 16, 17:
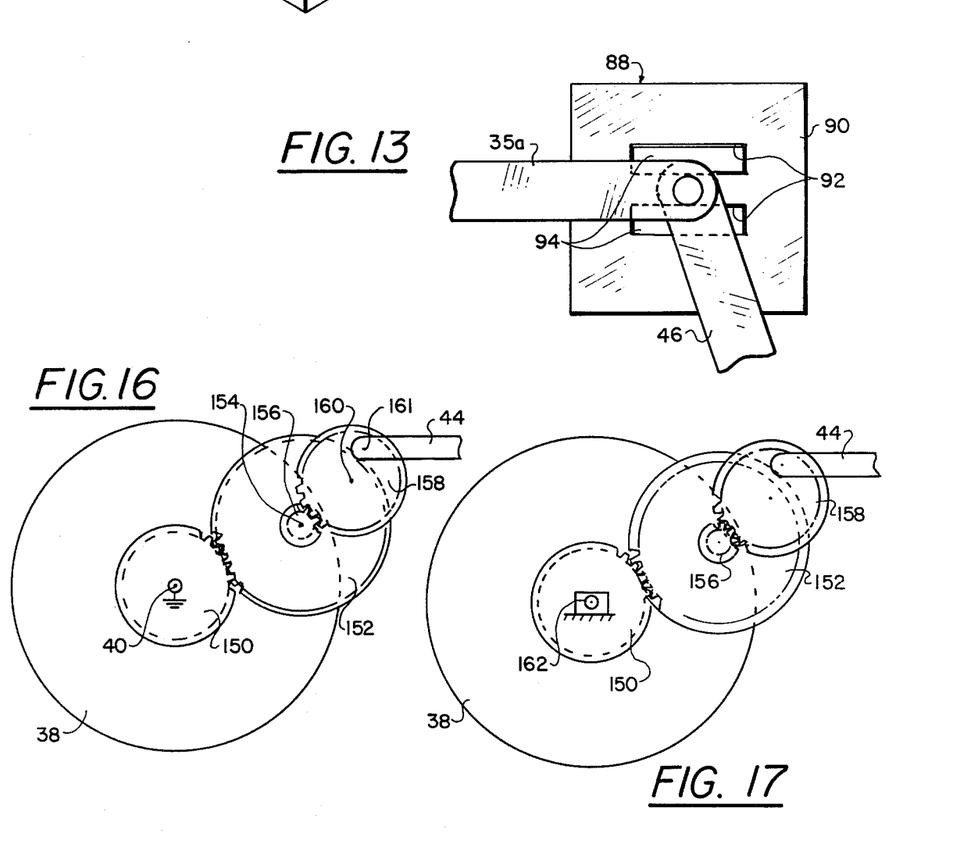
FIG. 13 is a schematic plan view of a lever clamping device utilized in the FIGS. 4, 6, and 8 embodiments.
FIG. 16 is a plan view of the rotor with various gear derives in an embodiment to obtain movements of the levers of the FIG. 2 embodiment suitable for causing the system to put out several (in this example 3) anharmonically related tones simultaneously.
FIG. 17 is the same as FIG. 16 except for a modification in the operation of the first cogwheel.

In another embodiment the action of the rotor 38 on the lever 44 in the FIG. 2 embodiment and consequently on the pistons 18 can be modified by the arrangement shown in FIG. 16. Coaxially with rotor 38 may be provided a cogwheel 150 which is fixed to the housing. The cogwheel 150 meshes with a cogwheel 152 which is eccentrically pivoted to the rotor 38 at 154. Concentrically fixed to the cogwheel 152 at the point 154 is a smaller cogwheel 156 which meshes with a cogwheel 158 which is eccentrically pivoted to the wheel 152 at 160. The lever arm 144 is then eccentrically connected to the wheel 158 at the point 161. The first pair of cogwheels 150 and 152 will jointly impose two oscillatory movements simultaneously on the lever arm 44, and the third cogwheel 158 will superimpose yet another oscillatory movement on the lever arm 44. These same types of movements will also be transmitted to the pistons 18, wherefore the pistons can be caused to put out several anharmonically related signal frequencies simltaneously.

The ratios of the output signal frequencies and amplitudes can be made any desired values by the proper choices of the sizes of the cogwheels 150, 152, 156, and 158, as well as the distances from 40 to 154, from 154 to 160, and from 160 to 161.

If the speed of rotor 38 is varied, all the output frequencies can be frequency modulated proportionately together. However, if cogwheel 150 is made separately rotatable as shown in FIG. 17, by means of a variable motor 162 which is fixed to the housing, the output frequencies of the system can be to a considerable degree frequency modulated independently of one another, that is the lowest frequency, which is a result of the rotation of the rotor 38, can be varied independently of the other frequencies.

If the amplitude adjustment means 56 of FIG. 2 is exercised, the amplitudes of all the frequencies put out by this embodiment can be modulated proportionately together as desired.

It should be understood that in all embodiments the journals at the various lever points can be lengthened to space the levers from one another sufficient distances to provide clearance between all components attached to the levers. Further, the two cable may include electrical power and control wires to the various components which may be selectively operated at a console 164 on the ship 10, see FIG. 1.

A recapitulation of the operations of the various embodiments is as follows: (1) the embodiment 22 in FIG. 2 can be operated so as to amplitude modulate and/or frequency modulate the pistons; (2) the modification 66 illustrated in FIGS. 3 and 4 adds the additional feature of enabling the pistons to be instanteously switched between the full amplitude and the zero amplitude conditions; (3) the modification 114 illustrated in FIGS. 5 and 6 adds still another feature in that the pistons can be instantaneously switched between the fundamental and the second harmonic of the rotor frequency; and (4) the modification 123 illustrated in FIGS. 7 and 8 adds still additional features in that the phase of the pistons can be reversed. Finally, the modification shown in FIG. 16 enables several anharmonically related output frequencies to be obtained simultaneously, along with frequency and amplitude modulation capabilities as may be desired.

Obviously, many other modifications and variations of the present invention are possible in the light of the above teachings. It is therefore to be understood that within the scope of the appended claims the invention may be practiced otherwise than as specifically described.

What is claimed is:

1. A nonresonant acoustic projector comprising:
a housing;
rocker arm means pivotally mounted within the housing on a fixed axis with respect to the housing and extending laterally within the housing from the rocker arm pivotal axis;
piston means sealably mounted in a wall of the housing so that one face of the piston is directed exteriorily and the other face of the piston is directed interiorily with respect to the housing;
said piston means having rod means which extends into the housing;
said rod means being pivotally connected to the rocker arm means at a position which is located laterally from the rocker arm pivotal axis; and
means connected to the rocker arm means at a lateral drive location for oscillating the rocker arm means about its pivotal axis so that the piston means will respond with reciprocatory movement.

2. A nonresonant acoustic projector as claimed in claim 1 including:
the housing having pairs of opposing walls; and n pairs of pistons, each pair being sealably mounted in opposite walls of the housing.

3. A nonresonant acoustic projector as claimed in claim 2 including:
each piston sealably mounted in a respective wall of the housing by a rolling seal.

4. A nonresonant acoustic projector as claimed in claim 3 including:
a linear bearing slidably supporting each piston rod; and
each piston rod having a pivot link between the rocker arm means and the respective linear bearing.

5. A nonresonant acoustic projector as claimed in claim 1 wherein the oscillating means includes:
rotor means rotatably mounted within the housing at a fixed axis which is parallel to the rocker arm pivotal axis and extending within the housing laterally with respect to its axis;
first, second, and third lever means mutually pivoted at a first point;
the first lever means being eccentrically and pivotally connected at a second point to the rotor means;
the second lever means being pivotally and eccentrically connected at a second point to the rocker arm means; and
means pivotally connected to the third lever means at a second point for laterally adjusting the position of the second point of the third lever means laterally within said housing.

6. A nonresonant acoustic projector as claimed in claim 5 wherein the adjusting means includes:
a variable speed motor.

7. A nonresonant acoustic projector as claimed in claim 6 including:
a plurality of intermeshing cogwheels interconnecting the rotor means to the first lever at its second point.

8. A nonresonant acoustic projector as claimed in claim 7 including:
a first one of the cogwheels being rotatably mounted to the housing coaxially with the rotor means;

a second one of the cogwheels being rotatably eccentrically mounted to the rotor means and intermeshing with the first cogwheel;
a third one of the cogwheels being fixably mounted in a coaxial relationship to the second cogwheel;
a fourth one of the cogwheels being rotatably eccentrically mounted to the second cogwheel and intermeshing with the third cogwheel; and
the first lever means being pivotally connected at its second point eccentrically to the fourth cogwheel.

9. A nonresonant acoustic projector as claimed in claim 7 including:
means fixed to the housing for variably speed rotating a first one of the cogwheels about an axis which coincides with the axis of the rotor means;
a second one of the cogwheels being rotatably eccentrically mounted to the rotor means and intermeshing with the first cogwheel;
a third one of the cogwheels being fixably mounted in a coaxial relationship to the second cogwheel;
a fourth one of the cogwheels being rotatably eccentrically mounted to the second cogwheel and intermeshing with the third cogwheel; and
the first lever means being pivotally connected at its second point eccentrically to the fourth cogwheel.

10. A nonresonant acoustic projector as claimed in claim 6 wherein the oscillating means includes:
track means for guiding the second point of the third lever means along a lateral path of predetermined length;
the adjusting means being connected to the track means for laterally adjusting the second point of the third lever means;
means for selectively clamping the second point of the third lever means to the track means at one end of said lateral path; and
means for selectively clamping the mutual pivot point of the second lever means and the rocker arm means at a fixed location, so that the third lever arm means can be stopped in the path while the second lever arm means oscillates the rocker arm means, or the rocker arm means can be stopped while the third lever means reciprocates back and forth in said path.

11. A nonresonant acoustic projector as claimed in claim 10 wherein the oscillating means includes:
the lengths of the second and third lever means between their points being of substantially the same length so that the second point of the third lever means can be moved by the adjusting means into alignment with the mutual pivot axis of the second lever means and the rocker arm means.

12. A nonresonant acoustic projector as claimed in claim 11 including:
a fourth lever means which is shorter than either of the second or third lever means, the fourth lever means being pivoted at a first point to the first, second, and third lever means at their mutual pivot point;
second track means pivoted to the first, second, third, and fourth lever means at their mutual pivot point for guiding a second point of the fourth lever means along a lateral path of predetermined length;
second adjusting means connected to the second track means for adjusting the second point of the fourth lever means along said arcuate path; and
second means for selectively clamping the second point of the fourth lever means to the second track means at one end of the lateral path.

13. A nonresonant acoustic projector as claimed in claim 6 wherein the oscillating means includes:
fourth lever means pivoted at a first end to the first, second, and third lever means at their mutual pivot point;
the second, third, and fourth lever means being of the same length;
track means for guiding the second point of the third lever means along a lateral path of predetermined length;
the adjusting means being connected to the track means for laterally adjusting the second point of the third lever means;
second track means for guiding the second point of the fourth lever means along a lateral path of predetermined length;
a second adjusting means connected to the second track means for laterally adjusting the second point of the fourth lever means;
means for selectively clamping the second point of the third lever means at a location intermediate the ends of the respective path;
means for selectively clamping the mutual pivot point of the second lever means and the rocker arm means at one or the other of two laterally spaced apart fixed positions; and
means for clamping the second point of the fourth lever means at one end of the respective path.

* * * * *